Patented Apr. 11, 1939

2,153,872

UNITED STATES PATENT OFFICE 2,153,872

METHOD OF MAKING ALKALI METAL SILICATES

George R. McDaniel, Cincinnati, Ohio, assignor, by mesne assignments, to Diamond Alkali Company, Pittsburgh, Pa., a corporation of Delaware No Drawing. Application March 7, 1935, Serial No. 9,902

6 Claims. (Cl. 23—110)

This invention relates to a new series of water soluble silicates in which the molecular ratio of alkali metal oxide ($R_2O$) to silica ($SiO_2$) is greater than unity, or that of the metasilicate, and is furthermore directed to a process of manufacturing these new materials. This disclosure is made in relation to the sodium salt formed of these materials inasmuch as the sodium silicate salts are those most commonly used. Comprehended within the spirit of this invention, likewise, are the silicates of the various metals of the alkali metal group, such as potassium, lithium, cesium, and the like.

Sodium metasilicate has particular utility for laundry work, for preparation of dishwashing compounds, and for many other detergent purposes because of high active alkalinity, sustained pH values, and the property of being capable to emulsify and suspend dirt particles. Nevertheless, there are many instances in which sodium metasilicate does not possess an active alkali content sufficiently high to give as much cleaning action as is often necessary or desired. If caustic soda be incorporated with hydrated sodium metasilicate in a dry mix for the purpose of increasing the alkalinity, the hygroscopic nature of the former material tends to cause the admixture particularly in certain ratios of the two constituents, to set up into a caked, wet-like mass which is difficult to handle. Moreover, a dry mixture of caustic soda and sodium metasilicate has certain disadvantages in that the discrete particles are not of a uniform composition, and in that the mixture is composed of individual particles, some of which are caustic soda and the remainder of which are sodium metasilicate. For some uses this physical state is very undesirable.

The demand of the industries using solid detergent silicates at the present time is for a product which is of uniform chemical composition, and which is in a finely divided condition, so that it may be readily removed from containers, measured, and dissolved into an aqueous solution.

It is the object of this invention to provide water soluble hydrated silicates having an alkaline content greater than the metasilicates, which hydrated silicates may be ground to any desired degree of fineness and preserved in such condition without danger of caking into a hard mass. Otherwise expressed, it is the object of this invention to produce hard, grindable cakes of water soluble silicates, characterized by the flexibility of the range of the $Na_2O:SiO_2$ ratio from 1:1 up to and including 2:1, in which these soluble silicates may be prepared.

Another object of this invention is the production of a hard, grindable cake capable of providing, when ground, a comminuted water soluble silicate, each particle of which is of identical and uniform composition.

I have discovered that water soluble silicates having an $Na_2O:SiO_2$ ratio greater than unity and containing variable amounts of water of crystallization somewhat depending upon the $$Na_2O:SiO_2$$

ratio, may be economically and practically manufactured by selection and control of the proper starting point in the manufacture, and by manipulation of temperature conditions throughout the process.

Broadly stated, my invention may be said to involve the application of the following novel concepts:

*I. Preparation of the sodium silicate solution, subsequently to be solidified*

(1) The temperature at which water may be evaporated from a sodium silicate solution having an $Na_2O:SiO_2$ ratio from 1:1, and up to and including 2:1, exerts a dominant and important influence on the nature of the end products produced. This influence is shown by the fact that precipitates form in the solution when evaporation to a sufficient extent is conducted by boiling at atmospheric pressures. The closer the $Na_2O:SiO_2$ ratio approaches 2:1, the more critical is the temperature range for evaporation, (without formation of precipitates) to a water content of the solution such that it may be subsequently solidified to a hard, grindable cake. The temperature at which evaporation should take place has been found to be below the boiling point of the sodium silicate solution at atmospheric pressures, and the control of this temperature of boiling may be effected by means of reduced pressures.

(2) A sodium silicate solution prepared by ordinary methods is chosen which is of such a composition that upon addition and solution of the proper amount of caustic soda at the preferred temperature there is automatically produced a sodium silicate solution having the desired $$Na_2O:SiO_2$$

ratio from 1:1, and up to and including 2:1, said solution, as constituted, possessing such a water content that the solution may be subsequently solidified to a hard, grindable cake of material. By this means the deleterious effects of boiling a dilute solution of sodium silicate of high $Na_2O:SiO_2$ ratio at atmospheric pressures are obviated in another manner.

II. Solidification of the sodium silicate solution.

(1) After having prepared a sodium silicate solution by either one of the two methods outlined above, those solutions having an $Na_2O:SiO_2$ ratio between 1:1, and up to approximately 1.6:1, may be solidified by supercooling a few degrees below the melting point, seeding, and agitating the solution until incipient crystallization has started. The material may then be poured into molds in which it will harden at ordinary temperatures.

(2) After having prepared a sodium silicate solution, by either one of the two methods outlined above, for those solutions having an $$Na_2O:SiO_2$$

ratio between 1.6:1, and up to and including 2:1, it is necessary, in order to produce a hard grindable cake, to relatively promptly supercool the solution to a temperature in general of 40–45° C. and preferably lower to a temperature such as 10–30° C., after which the solution is agitated until incipient crystallization starts, and then allowed to age for some days at a temperature, preferably, as low as 10–30°.

Generally, in the manufacture of sodium metasilicate, the common method is to add caustic soda to a liquid silicate of soda, such as the grades commonly known as 40 or 42 degree Beaumé, in which the molecular ratio of $Na_2O:SiO_2$ is approximately 1:3.28, in an amount sufficient to produce a molecular ratio of $Na_2O:SiO_2$ of 1:1. A quantity of water is also used to facilitate the solution of caustic soda in the 40 or 42 degree Beaumé silicate of soda. Since the metasilicate solution thus formed contains an excess of water over that required for the production of the pentahydrate of sodium metasilicate, the common commercial grade, this excess water must be removed. It should be noted that some water would have to be removed to form the pentahydrate, even though the amount of water necessary to facilitate solution of the caustic soda were not employed.

Therefore, removal of water is commonly effected by boiling the sodium metasilicate solution at atmospheric pressures until the water content corresponds to a definite hydrate which will crystallize, under proper conditions, to a hard mass.

Generally, as has been noted, for the manufacture of commercial sodium metasilicate, the hydrate thus produced is the pentahydrate ($Na_2SiO_3.5H_2O$), which in the liquid phase at its boiling point under atmospheric pressures is a water clear substance. The liquid sodium metasilicate is then supercooled slightly below its melting point, seeded, and agitated until incipient crystallization starts. This material, upon aging, sets up to a hard mass.

If, to the contrary, an amount of caustic soda, together with water be added to a silicate of soda, such as 40 or 42 degree Beaumé, so that the molecular ratio of $Na_2O:SiO_2$ of the solution thus produced lies between a value appreciably greater than 1:1 and up to and including 2:1, and if this solution be boiled at atmospheric pressure for evaporation as previously outlined for a solution of metasilicate ratio, then very undesirable and negative results are experienced. In such a solution, with any given ratio more alkaline than that of sodium metasilicate, upon appreciable evaporation of water by boiling at atmospheric pressures, there is formed a white precipitate which increases in amount as water is removed. Also, as the $Na_2O:SiO_2$ ratio approaches 2:1, the precipitate is formed in the boiling solution at a higher molal concentration of water than in ratios close to 1:1. Moreover, it is necessary in most instances for the water content to be reduced below the point at which a precipitate forms in the boiling solution in order that the solution may be subsequently solidified to a hard cake. In other words, sodium silicate solutions having $Na_2O:SiO_2$ ratios appreciably higher than 1:1, and up to and including 2:1, and having a water content such that the solution can, under proper conditions, be subsequently solidified to a hard mass, are not stable and do not remain homogeneous at their atmospheric boiling points.

The precipitates formed on boiling such solutions settle to the bottom of the containing vessel and tend to cake into hard masses which are difficult to remove. The formation and settling of these precipitates destroys the homogeneity of the solution and causes so many difficulties that solidification of the material to a hard cake is very difficult and troublesome to achieve silicate compositions having $Na_2O:SiO_2$ ratios above 1:1 up to and including 1.6:1, and is a practical impossibility for ratios from 1.6:1, up to and including 2:1.

However, according to the methods of this invention, sodium silicate solutions having an $Na_2O:SiO_2$ ratio between 1:1, and up to and including 2:1, may be prepared in a water clear condition, possessing such a water content that subsequent solidification to a hard, grindable cake is possible. Such solutions may be prepared according to two general methods as already briefly disclosed: (1) Removal of water by boiling under reduced atmospheric pressures, thus lowering the boiling point temperature of the solution; (2) addition of caustic soda to a selected sodium silicate solution while maintaining a close temperature control.

I shall now disclose a preferred procedure for the preparation of the sodium silicate solutions according to the two general methods, after which I shall describe the manner in which such solutions can be solidified to hard, grindable material.

According to the first method (1) caustic soda is added to a silicate of soda such as commercial 40°–42° Bé. in an amount calculated to produce the desired $Na_2O:SiO_2$ ratio between 1:1 and up to and including 2:1. It is necessary to also add an amount of water to effect complete solution of the caustic soda and silicate of soda, and the water is preferably mixed into the silicate of soda after which the caustic soda is introduced. After complete mixing, the excess water is removed from the solution by boiling under reduced pressure, thereby reducing the temperature below the atmospheric boiling point.

It is recommended that the temperature of the boiling solution be held between 75° and 90° C., and preferably at 80° C. At a $Na_2O:SiO_2$ ratio of 2:1, this temperature is much more critical for prevention of a precipitate in the solution than at ratios close to 1:1. For a solution of $Na_2O:SiO_2$ ratio of 2:1 (or sodium orthosilicate ratio), this boiling temperature is preferably maintained close to 80° C. to prevent formation of precipitates. However, a water clear solution of a sodium orthosilicate ratio may be prepared by this method containing as low as 6 mols of water, that is, having a composition represented by the formula, $2Na_2O.SiO_2.6H_2O$. In order to maintain the reduced boiling temperatures as required, the solution is boiled under vacuum which may be increased as the solution becomes more concentrated. The final vacuum may be as great as 27 to 28 inches of mercury.

In general, water should be evaporated by boiling under reduced pressure until the water content of the solution corresponds to the number of mols of water that would be automatically formed if caustic soda were added to melted pentahydrate of sodium metasilicate to produce the same molecular ratio of $Na_2O$ to $SiO_2$. It has been observed that such a water content produces a solid material which is very hard and grindable in nature and exhibits good keeping qualities. However, there are sodium silicate solutions with other water contents which may be produced according to the present methods (see Example 2 which is given later), and my invention is intended to include within its scope the preparation of any such sodium silicate solutions that can be solidified to a hard grindable cake. Having prepared a sodium silicate solution according to this method, the liquid mass is then solidified in the manner to be presently described.

According to the second method (2) caustic soda is added preferably to the molten pentahydrate of sodium metasilicate ($Na_2SiO_3.5H_2O$) in an amount calculated to produce the desired $Na_2O:SiO_2$ ratio between 1:1, and up to and including 2:1. Sodium silicate solutions other than the pentahydrate of sodium metasilicate can be used such, for instance, as a solution having a composition represented by the formula

$.7Na_2O.SiO_2.4.7H_2O$.

It is recommended that the silicate selected as a base material or starting material have a water content suitable when caustic soda is added to automatically provide the water required in the production of the end product.

In this method it is preferred that the temperature of the liquid sodium metasilicate be quite closely controlled at the time of addition and mixing of the caustic soda. The temperature of the liquid sodium metasilicate should be held generally between 70 and 85° C. The solution as formed after addition of the caustic soda is devoid of precipitates. The number of mols of water of crystallization varies between 5 and 6 depending upon the ratio produced when the caustic soda is added to the pentahydrate of sodium metasilicate. In general, it may be stated that the mols of water thus automatically produced by adding caustic soda to the melted pentahydrate of sodium metasilicate, form solutions that can be solidified to hard, grindable cakes. Such material when ground remains stable against agglomeration and caking. Material containing too great a variation in water content from that defined may exhibit tendencies toward caking or agglomeration. However, as illustrated in Example 2 which follows later, there are water contents, other than those automatically produced when caustic soda is added to the pentahydrate of sodium metasilicate, which produce hard, grindable cakes of material, and my invention is intended to include within its scope the preparation of any such compounds.

After having prepared the sodium silicate solution according to either one of the two methods just outlined, for those solutions having an $Na_2O:SiO_2$ ratio between 1:1 and approximately 1.6:1, the liquid mass is supercooled approximately 5° to 10° C. below its melting point and stirred until incipient crystallization has started as evidenced by a temperature rise. In order to promote more rapid crystallization, the liquid silicate may be seeded with fine material of substantially the same composition while being stirred. After a temperature rise has been noted, the material is poured into pans where it is aged at room temperatures. This material sets up to a hard, grindable solid which may be reduced by grinding to any desired degree of fineness, and the ground material so produced remains in a dry, free-flowing state when preserved in air-tight containers.

For those sodium silicate solutions having an $Na_2O:SiO_2$ ratio between 1.6:1 and up to and including 2:1, prepared by either one of the two methods previously outlined, it is recommended, in order to provide a liquid which solidifies to a hard cake, to supercool the solution quickly to a temperature in general of 40–45° C. and preferably to a temperature such as 10 to 30° C. During the operation of supercooling, the sodium silicate solution should be stirred or agitated as little as possible, as, otherwise, crystals form which are incompatible to the later production of a hard, grindable material. Thus, the solution after constitution should be supercooled without delay to a temperature such as 10 to 30° C. without the formation of any crystals. Then, the solution is agitated until incipient crystallization is started as evidenced by a temperature rise, or by the solution turning white from formation of crystals. The solution may be seeded with material of the same composition, but seeding is not essential in this instance.

After incipient crystallization has been started in the solution, the material is allowed to age for a number of days, preferably at a temperature such as 10–30° C. during which time it solidifies to a hard, grindable cake of material. Such cakes of material may be reduced to any desired degree of fineness by grinding, and the ground material thus produced is in a dry, free-flowing state.

As specific examples, the following disclosures are made, but it should be understood that these examples are selected primarily for the purpose of assisting those skilled in the art in carrying out my invention, and that many other compounds may be made following the same general principles which I have discovered.

In general, it may be said that the alkali metal silicates disclosed in this invention do not sharply differ from one another with respect to response in temperature changes or with respect to changes in chemical manipulation. In the preceding disclosure, and in the examples following, the temperatures and procedure indicated are not precisely critical but are made for the purpose of assisting those skilled in the art. It is intended, therefore throughout the specification, that equivalent changes as to temperature and chemical procedure be within the scope of this invention. The two general classifications into which the products of the invention divide themselves, likewise are not separated by a sharply distinguishable line.

*Example No. 1 for the preparation of*
*$1.33Na_2O.SiO_2.5.36H_2O$*

To 200 parts by weight of melted pentahydrate of sodium metasilicate ($Na_2SiO_3.5H_2O$) are added 25.5 parts by weight of 76% caustic soda, preferably of the flake form. The temperature of the melted metasilicate should be approximately 80° C. upon the addition of the caustic soda which should be added gradually and with constant stirring. After complete solution of the caustic soda, the mixture is cooled to 70° C., and seed crystals, preferably of the same composition, are added. The solution is further cooled to approximately 65° C., and maintained at approximately this temperature while stirring. After incipient crystallization starts as noted by a temperature rise, the material is poured into pans to harden. After complete solidification the cake can be ground into a dry, free-flowing material which will not exhibit any tendency to agglomerate when preserved in air-tight containers.

Example No. 2 for preparation of $1.61Na_2O.SiO_2.6.1H_2O$

To 255 parts by weight of melted pentahydrate of sodium metasilicate ($Na_2SiO_3.5H_2O$) are added 10 parts by weight of water and 60 parts by weight of 76% caustic soda, preferably of the flake form. After mixing the water and the melted sodium metasilicate, the temperature of the solution is adjusted to approximately 80° C., and the caustic soda gradually added with constant stirring. After complete solution of the caustic soda, the mixture is cooled to 70° C. and seed crystals, preferably of the same composition, are added. The solution is further cooled to approximately 65° C., and maintained approximately at this temperature while stirring. After incipient crystallization begins as noted by a temperature rise, the material is poured into pans to harden. After complete solidification, the cake can be ground into a dry, free-flowing material which will not exhibit any tendency to agglomerate when preserved in air-tight containers.

The 10 parts by weight of water used in constituting this solution may be omitted from the formula if desired. Its presence facilitates handling of the material during the preparatory period. If the water is omitted, the water of crystallization of the resulting compound will be proportionately less.

Example No. 3 for preparation of $2Na_2O.SiO_2.6H_2O$ under reduced pressure To 400 parts by weight of a 42 degree Beaumé silicate of soda containing 9.5% $Na_2O$ and 30.2% $SiO_2$ are added 200 parts by weight of water, and 279 parts by weight of 76% caustic soda. The water is mixed in the silicate of soda after which the caustic soda is dissolved in the solution. This solution is then introduced into a vacuum distillation apparatus, and water is evaporated therefrom by boiling, while the temperature of the solution is maintained at approximately 80° C. The vacuum in the apparatus may be of the order 27 to 28 inches of mercury. Evaporation of the water is continued until 291 parts by weight of water are removed. The solution at this time is water clear and the water left remaining is sufficient to constitute 6 waters of crystallization.

After evaporation, the clear solution should be supercooled without delay to 20° C. with only gentle stirring if this should be necessary to facilitate the supercooling. Too much time should not be taken for the operation of supercooling in order to produce a hard, grindable material. After this temperature is reached, the solution should be agitated until white from formation of crystals, and until a temperature rise such as 3 to 5° C. is noted. The material is then preferably aged at a temperature of 10–15° C., although it may be aged at room temperature. Aging at the lower temperatures, however, appears to produce a harder cake. After aging a number of days, the material is of a very hard, grindable nature.

Similar compounds having an $Na_2O:SiO_2$ ratio from 1.6:1 up to 2:1 may be prepared using this same general method and using the proper amount of caustic soda to constitute the desired ratio.

Example No. 4 for preparation of $2Na_2O.SiO_2.6.1H_2O$ by addition of caustic soda to sodium metasilicate To 200 parts by weight of melted pentahydrate of sodium metasilicate ($Na_2SiO_3.5H_2O$) are added 77 parts by weight of 76% caustic soda, preferably of the flake form. The temperature of the melted sodium metasilicate should be approximately 70° C. upon the addition of the caustic soda which should be added with constant stirring. After complete solution of the caustic soda, the mixture should be supercooled without delay to 20° C. with only gentle stirring if this should be necessary to facilitate the supercooling. After this temperature is reached, the solution should be agitated until white from formation of crystals, and until a temperature rise such as 3–5° C. is noted. The material is then preferably aged at a temperature of 10–15° C. After aging a number of days, the material is of a very hard, grindable nature.

It is also possible that a combination of the two general methods described may be employed. For instance, a sodium silicate solution having the composition represented by the formula $1.5Na_2O.SiO_2.4.5H_2O$ may be prepared by evaporation under reduced pressure, and while this solution is kept at a temperature of approximately 75–80° C., sufficient caustic soda added to constitute the orthosilicate ratio. In this manner the final composition is represented by the formula, $2Na_2O.SiO_2.5H_2O$. Thus by using a combination of the two methods, more variation and latitude with respect to the water content of the sodium silicate composition may be obtained.

In this way I provide hard, grindable cakes of alkali metal silicates possessing a ratio of alkali metal oxide to silica which may have any desired value from 1:1 (metasilicate) to and including 2:1 (orthosilicate). When the cakes are ground or finely divided, they yield a mass of hydrated water soluble particles which remain in this subdivided condition, and each one of which comprises alkali metal oxide and silica in the desired ratio. These granulated masses are excellent detergents, and highly suitable for use in commercial dishwashing, in laundering operations, and for other detergent purposes.

Having described my invention, I desire to be limited only by the ensuing claims:

1. In the art of manufacturing silicates of alkali metal which are soluble in water, the method which comprises mixing a substantial quantity of water in a mass of liquid silicate of soda, then dissolving caustic soda in said solution, sufficient in quantity to provide therein more than 1.5 molecular parts of $Na_2O$ for each molecular part of $SiO_2$, then evaporating water in excess of that required to produce a hydrate of sodium silicate of approximately 5 to 7 molecules water of hydration, by placing the solution under vacuum sufficient to enable the solution to boil at a temperature of approximately 75 to 90° C. until a water-clear liquid is established, then supercooling said liquid rapidly after its establishment to induce crystallization thereof to a hard grindable solid mass.

2. The method of making a hard, grindable cake of hydrous alkali metal silicate having a ratio of metal oxide to silica above 1:1 and up to and including 2:1, which method comprises, preparing a solution of the desired ratio by adding alkali metal hydroxide together with water to alkali metal silicate, then placing this solution under sufficient vacuum to enable the solution to boil at a temperature of 75 to 90° C., and evaporating water from the solution under this condition, until the solution contains the amount of water sufficient to provide approximately 5 to 7 molecules water of hydration, and subsequently solidifying the solution by supercooling it quickly to a temperature of about 10 to 45° C., then agitating the solution until crystallization begins and then casting it, and permitting it to solidify to a hard, grindable cake.

3. The process for making a hard, grindable cake of hydrous, alkali metal silicate, which comprises, preparing a solution containing alkali metal oxide to silica, in proportions above 1:1, up to and including 2:1, and containing an amount of water in excess of that required to provide 5 to 7 molecules water of hydration, then placing the solution under a vacuum, sufficient to enable the solution to be boiled at a temperature of about 75 to 90° C., and evaporating water from the solution under such conditions until the solution contains the amount of water sufficient to provide 5 to 7 molecules water of hydration, then supercooling the solution to a temperature below 45° C. and then agitating the liquid until crystallization begins and, finally casting the liquid and permitting it to crystallize to a hard, grindable cake.

4. The method of making a hard, grindable cake of hydrous, alkali metal silicate, which method comprises, preparing a solution containing alkali metal oxide and silica in the proportion above 1:1, up to and including 2:1 and containing an amount of water in excess of that required to provide approximately 5 to 7 molecules water of hydration, then placing the solution in a chamber and evacuating the chamber until the solution will boil therein at a temperature of about 80° C., and evaporating water from the solution in the chamber at such temperature until the solution contains an amount of water not in excess of that required to provide 5 to 7 molecules water of hydration, then supercooling the solution to a temperature below approximately 45° C., then treating the solution to induce crystallization, then casting and solidifying the solution after crystallization has started.

5. The method of making a hard, grindable cake of hydrous, sodium silicate, which comprises, preparing the solution of sodium hydroxide and sodium metasilicate and water, in which the proportion of sodium oxide to silica is above 1:1, up to and including 2:1, and in which the amount of water is in excess of that required to provide 5 to 7 molecules of water of hydration, then placing the solution in a chamber and evacuating the chamber until the solution will boil at a temperature of about 75 to 90° C., and evaporating excess water from the solution at such temperature until the water content of the solution is not in excess of that required to provide 5 to 7 molecules water of hydration, then supercooling the solution at a temperature below approximately 45° C., and agitating and seeding the solution, if necessary, to induce crystallization and casting the solution after crystallization has started.

6. The method which comprises, preparing a solution containing approximately two molecular parts $Na_2O$ to each molecular part of $SiO_2$ and containing an amount of water in excess of that required to provide 5 to 7 molecules water of hydration, placing the solution under vacuum sufficient to enable it to boil at a temperature of approximately 75 to 90° C. and evaporating water from the solution until the water content is not in excess of that required to provide 5 to 7 molecules water of hydration, during the period of time when the solution is at a temperature of approximately 75 to 90° C., then supercooling the solution to a temperature below 45° C., and agitating and seeding, if necessary, to induce crystallization, then casting the solution and permitting it to solidify to a hard, grindable cake.

GEORGE R. McDANIEL.